United States Patent [19]
Koike et al.

[11] Patent Number: 5,138,602
[45] Date of Patent: Aug. 11, 1992

[54] SOUND RECORD PLAYING APPARATUS HAVING SHOCK RESPONSIVE WEIGHT MEMBER TO ACTUATE THE SAME

[75] Inventors: Eishi Koike, Sagamihara; Seiji Ohata, Machida, both of Japan

[73] Assignee: Ozen Corporation, Machida, Japan

[21] Appl. No.: 692,186

[22] Filed: Apr. 26, 1991

[30] Foreign Application Priority Data

Apr. 27, 1990 [JP] Japan .................. 2-114106

[51] Int. Cl.⁵ .................. A63H 3/33; G11B 31/00; G11B 17/22
[52] U.S. Cl. .................. 369/67; 369/31; 369/63
[58] Field of Search .................. 369/258, 31, 63, 65, 369/66, 67

[56] References Cited

U.S. PATENT DOCUMENTS

| | | | |
|---|---|---|---|
| 4,209,174 | 6/1980 | Shiseki | 369/67 |
| 4,404,668 | 9/1983 | Watanabe | 369/31 X |
| 4,694,446 | 9/1987 | Koike | 369/63 X |
| 4,827,465 | 5/1989 | Koike | 369/67 |

FOREIGN PATENT DOCUMENTS

| | | |
|---|---|---|
| 57-10493 | 1/1982 | Japan . |
| 1079060 | 8/1967 | United Kingdom . |
| 1458768 | 12/1976 | United Kingdom . |
| 2043319A | 5/1979 | United Kingdom . |
| 2038072A | 11/1979 | United Kingdom . |
| 1560338 | 2/1980 | United Kingdom . |

*Primary Examiner*—John W. Shepperd
*Assistant Examiner*—Michael C. Kessell
*Attorney, Agent, or Firm*—Weintraub, DuRoss & Brady

[57] ABSTRACT

A turn table having a sound recording disk or record mounted thereon is normally urged upwardly by a spring disposed between a lower surface of the turn table and a chassis of a casing to apply a stylus force to a pickup. A weight member is rotatably and eccentrically supported on an inside mounting plate, and an operating claw having a slant surface formed on a lower surface is fixed to the weight member. When a shock is applied to the weight member externally, the weight member rotates by an inertia force in a plane perpendicular to a rotary shaft of the turn table. As a result, the operating claw on the weight member moves toward an upper end of the rotary shaft. The slant surface of the operating claw rides over the upper end of the rotary shaft to downwardly press the rotary shaft together with the turn table. Thus, the stylus force of the pickup is released. When the weight member returns to an original position, by a return spring, the operating claw retreats, and the turn table also returns to the upper position.

9 Claims, 4 Drawing Sheets

SOUND RECORD PLAYING APPARATUS HAVING SHOCK RESPONSIVE WEIGHT MEMBER TO ACTUATE THE SAME

BACKGROUND OF THE INVENTION

1. Field of the Invention

The present invention relates to a sound record playing apparatus in which the reproduction of the sound stored on the record is started by applying a shock externally.

2. Description of the Prior Art

A sound record playing apparatus of the shock-start type is disclosed, for example, in Japanese Patent Laid Open Publication No. 57-10493.

In this apparatus, a speaker cone is disposed in a casing to enable it to move up and down. A pickup for scanning a modulated groove of a sound record or record is disposed between the speaker cone and the record. A spring applying a stylus force for urging the speaker cone downwardly is disposed between the casing and the speaker cone. The speaker cone is formed with a protruding portion by extending a part of the speaker cone downwardly. In the inside of the speaker cone, a weight member is eccentrically and rotatably supported by a rotary shaft of the record. A cam member, which is abuttable against the protruding portion, is fixed to the weight member integrally.

Accordingly, when a shock is applied to the apparatus externally, the weight member is rotated and the cam member, which is integral with the weight member, scoops upwardly the protruding portion of the speaker cone. Thus, since the speaker cone is moved upwardly against the urging force of the spring, the stylus force which has been applied to the pickup is released.

Specifically, in the apparatus, by moving the speaker cone upwardly and downwardly, the stylus force is applied to and released from the pickup thereby to control the playing of the record.

However, in the prior art apparatus, since a stylus force mechanism is formed by making the speaker cone as a movable member, the mounting of the speaker cone is not rigid. Thus, it is possible that a movable portion of the speaker cone may be broken when the playing of the record is repeated. Furthermore, in this apparatus, regardless of the fact that the speaker cone is a vibrating body and is formed by a thin plate, the weight member is brought into abutment with a part of the speaker cone with high frequencies. As a result, the speaker cone itself is apt to be broken and, therefore, the durability is low.

SUMMARY OF THE INVENTION

The present invention was made in view of the problem mentioned above, and it is, therefore, an object of the invention to provide a shock-start type sound record playing reproducing apparatus in which the speaker cone is not a movable member, but a rigid structure, having excellent durability.

A sound record playing apparatus in the present invention includes a sound record or record having a modulated groove formed in an upper surface thereof. A pickup for scanning the modulated groove of the record is disposed thereon, and a turntable for rotating the record is integral with the turn table, such that the turntable contacts a lower surface of the record. An elastic member, such as a spring, is connected to the turntable to urge the turntable upwardly, the elastic member applying a stylus force to the pickup. A weight member is rotatably supported at an eccentric position on the turntable to form a rotating portion by a large part of the weight member. The rotating portion is rotated about the eccentric position as a fulcrum and is moved toward and away from the rotary shaft of the turntable. An interlock mechanism is formed between the weight member and the turntable to move the turntable up and down in an interlocked relation with the movement of the weight member toward and away from the rotary shaft of the turntable.

The weight member may be rotatably supported at the eccentric position thereof so that the rotating portion is rotated about the eccentric position in a plane perpendicular to the rotary shaft of the turntable. The rotating portion is allowed to abut against a part of the turntable. A slant surface may be formed on either the weight member or the turntable, or alternately the drive shaft, so as to enable the rotating portion of the weight member to ride over the part of the turntable to press down the turntable.

When an external shock is applied to the record, the weight member, which is supported eccentrically, is rotated about the fulcrum, and the rotating portion is moved toward the rotary shaft of the turntable. An interlock or interlink mechanism provided between the weight member and the turntable is operable to move the turntable downwardly against the urging force of the spring. Thereby the stylus force is applied to the pickup.

On the other hand, when the rotating portion is moved away from the turntable, the turntable is moved upwardly by the urging force of the spring to thereby apply the stylus force to the pickup.

In the case where the interlock mechanism includes the slant surface, the rotating portion of the weight member rides over the part of the turntable guided by the slant surface to press down the turntable to thereby release the stylus force of the pickup.

Specifically, in this apparatus, the structure is provided to move the turntable up and down in accordance with the rotation of the weight member, and consequently, the stylus force of the pickup is applied and released. By virtue of the structure, there is no need to form the speaker cone as a movable member, and the damage of the speaker cone can be avoided.

For a more complete understanding of the present invention, reference is made to the following detailed description and accompanying drawings, in which:

DESCRIPTION OF THE PREFERRED EMBODIMENTS

An embodiment of the invention will be described with reference to FIGS. 1 to 3.

Figure 1:
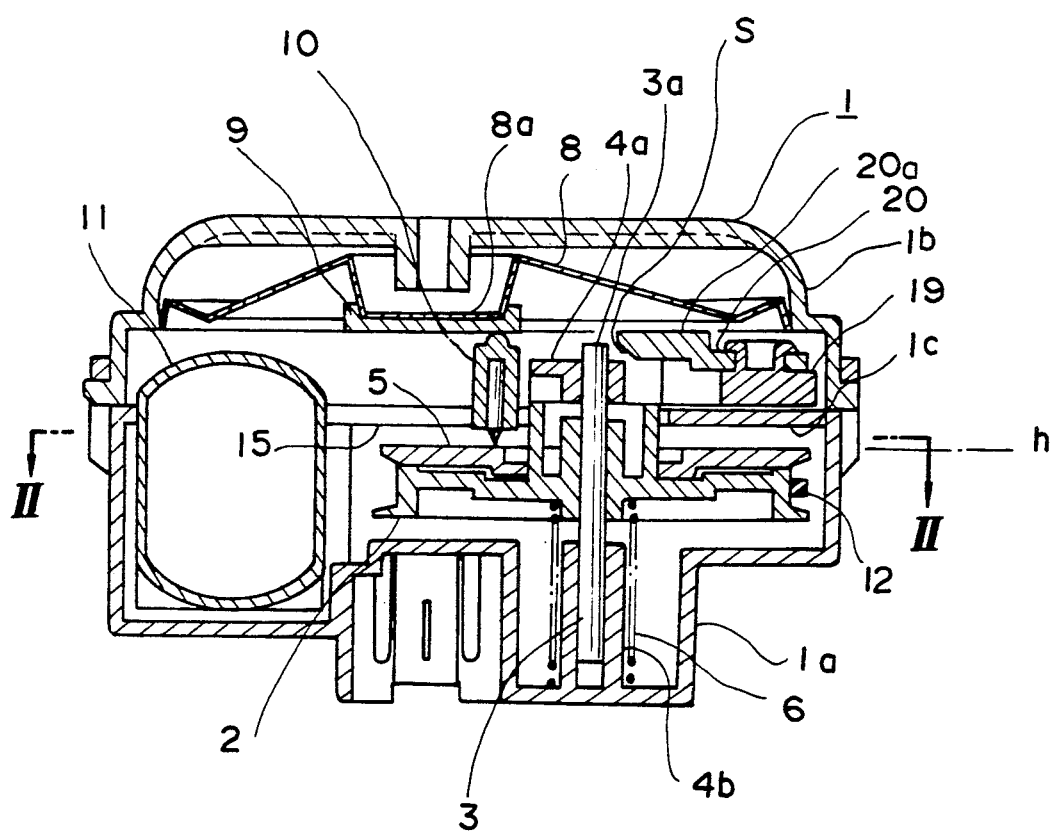
FIG. 1 is a side sectional view of a shock-start type record playing apparatus of a first embodiment of the present invention.

As shown in FIG. 1, a casing 1 of a sound record playing apparatus includes of a lower chassis 1a, an upper housing 1b, and an inside mounting plate 1c which is disposed between the lower chassis 1a and the upper housing 1b.

A turntable 2 is rotatably supported between the chassis 1a and the inside mounting plate 1c. A rotary shaft 3 for the turntable 2 is fitted into bearings 4a and 4b, respectively, formed in the chassis 1a, and the inside mounting plate 1c so that the turntable 2 is movable up and down. An upper end 3a of the rotary shaft 3 protrudes beyond an upper surface of the bearing 4b. A recording disk or record 5 is concentrically fixed to an upper surface of the turntable 2. A spring 6 is disposed between the turntable 2 and the chassis 1a, so that spring 6 is in abutment with a lower surface of the turntable 2 to urge the turntable 2 upwardly. In a normal condition, the record 5 is maintained at a predetermined height h, hereinafter, referred to as a reproducing height h.

A speaker cone 8 is fixed to the housing 1b. A sound conductor body 9 is fixed to a lower surface of a flat bottom portion 8a of the speaker cone 8, which flat portion 8a is recessed downwardly. When the record 5 is positioned at the reproducing height h, a pickup 10 is positioned intermediate the record 5 and the sound conductor body 9.

Figure 2:
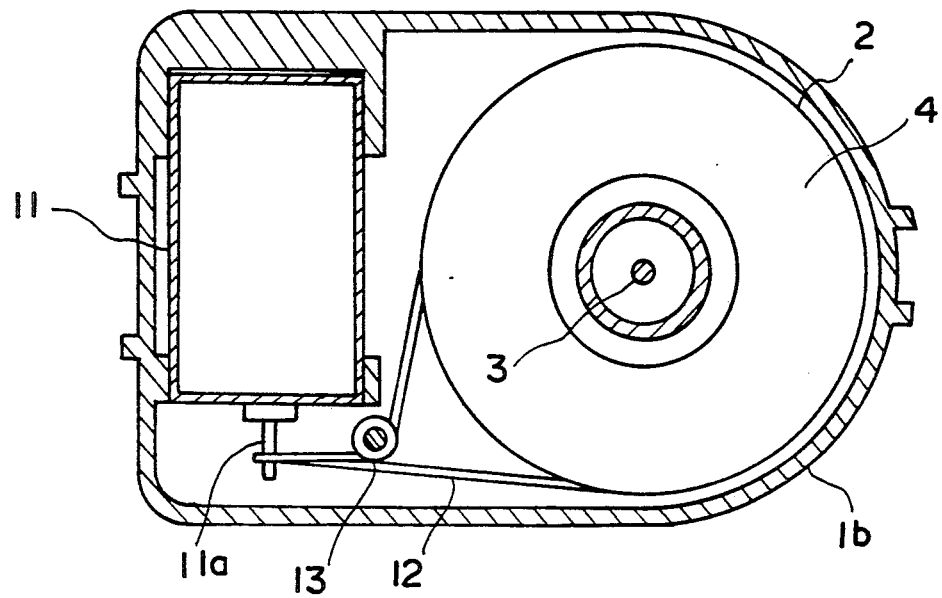
FIG. 2 is a plan sectional view of the apparatus taken along line II—II in FIG. 1.

As shown in FIG. 2, a motor 11, which is a driving device, is disposed within the chassis 1a in the vicinity of the turntable 2. A belt 12 which engages with a rotary shaft 11a of the motor 11 also, engages a peripheral edge of the turntable 2 by wrapping about the peripheral edge, after twisting the belt 12 through a pulley 13. The belt 12, motor 11 and pulley 13 comprises a means for driving the rotary shaft.

Figure 3:
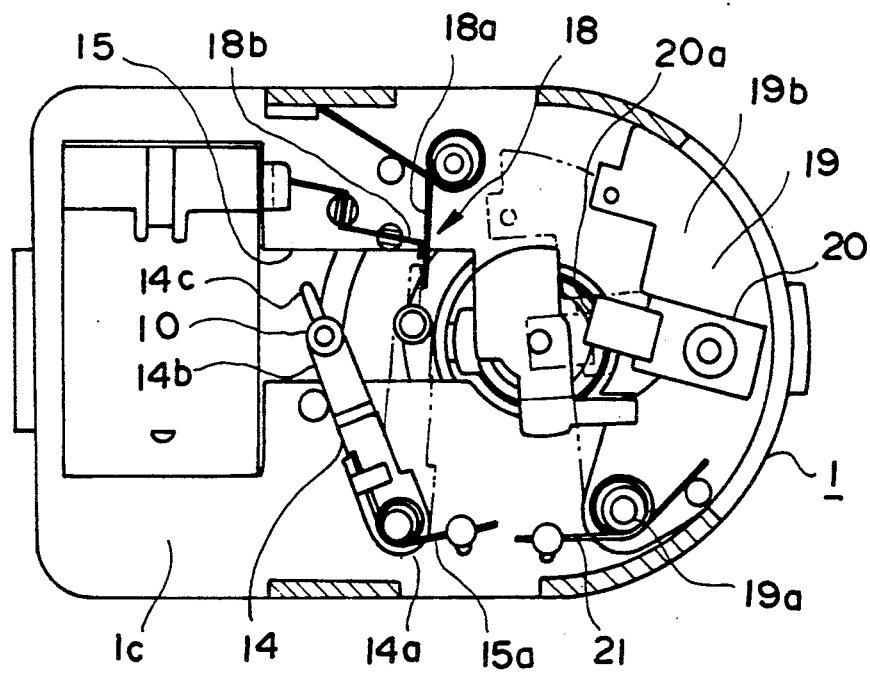
FIG. 3 is a plan view of the apparatus with the housing removed.

With reference to FIG. 3, a tone arm 14 is mounted on an upper surface of the inside mounting plate 1c with a base portion 14a of the tone arm 14 being rotatably supported.

A pickup 10 is fixed to an end 14b of the freely turning tone arm 14. As shown in FIG. 1, an upper end of the pickup 10 is in abutment with a lower surface of the sound conductor body 9. A lower end of the pickup 10 is in abutment with the record 5 by protruding or projecting through a window 15 which is formed in the inside mounting plate 1c. A return spring 15a is interposed the tone arm 14 and the inside mounting plate 1c to urge the tone arm 14 toward an outer peripheral edge of the record 5. Under a condition wherein the stylus force of a pickup 10 is released, the tone arm 14 is, as shown by the solid line in FIG. 3, stopped at a position, hereinafter referred to as the sound reproduction waiting position, at which the pickup 10 engaged with a start end of the modulated groove of the record 5.

Furthermore, a switch 18 for operating and stopping the motor 11 is disposed on the inside mounting plate 1c. As shown by the broken line in FIG. 3, when the pickup 14 moves to a predetermined position, hereinafter, referred to as the sound reproduction finished position, at which the pickup 14 finishes reproduction of the record 5, a projection 14c formed on an end of the tone arm 14 presses a flexible plate 18a of the switch 18 to interrupt a contact between the flexible plate 18a and a contact pin 18b.

A weight member 19, having a substantially semicircular shape, is disposed on a right end portion (FIGS. 1 and 3) of the inside mounting plate 1c. A semicircular circumferential edge of the weight member 19 extends along a semicircular inner peripheral surface of the casing 1. The weight member 19 is rotatably supported at one end as a fulcrum 19a on the inside mounting plate 1c, and thus, the weight member 19 is supported eccentrically. Most of the weight member 19, except the fulcrum 19a, defines a rotating portion 19b which rotates toward and away from the rotary shaft 3 of the turntable 2.

A return spring 21 is interposed the weight member 19 and the inside mounting plate 1c to urge the weight member 19 to move away from the rotary shaft 3. Normally, the weight member 19 is stopped at a position away from the rotary shaft 3.

Furthermore, an operating claw 20, having an extreme end portion 20a, protruding toward the rotary shaft 3, is fixed to the rotating portion 19b of the weight member 19. As shown in FIG. 1, the extreme end portion 20a has a slant surface S formed on a lower surface so that the extreme end portion 20a is tapered from the lower surface to the extreme end. When the weight member 19 is rotated, as shown by the broken line in FIG. 3, the extreme end portion 20a of the operating claw 20 is superposed on the upper end of the rotary shaft 3. The slant surface S presses down the upper end 3a of the rotary shaft 3, thereby moving the rotary shaft 3 downwardly. Thus, in this record playing apparatus, the slant surface S of the operating claw 20 defines an interlock mechanism which is operable between the turntable 2 and the weight member 19.

Next, the operation of the recording disk reproducing apparatus will be described with reference to FIGS. 3 and 4A to 4C.

Figure 4A:
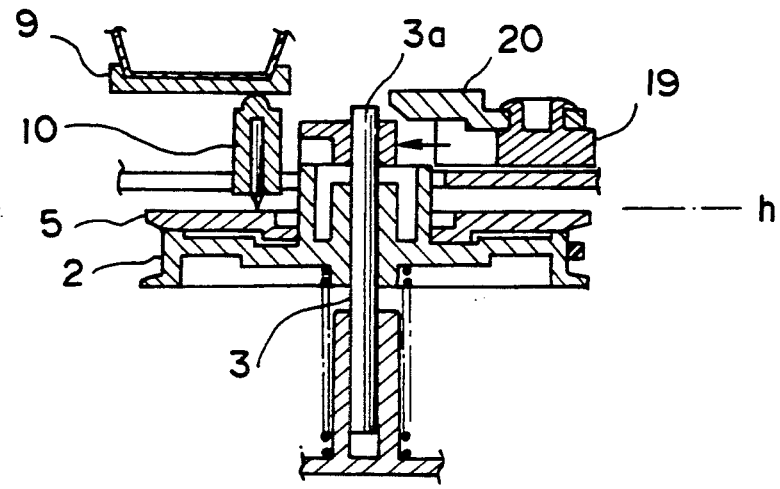
FIGS. 4A to 4C are sectional views of a part of the apparatus for explaining an interlock operation between the weight member and the turntable; and, FIGS. 5A to 5C show alternate embodiments of the interlock mechanism.

FIG. 4A shows the record playing apparatus in a normal condition in which reproduction of the sound stored on the record 5 is not performed.

The pickup 10, once it has finished scanning the record 5, moves to the reproduction finished position. Since the record 5 is maintained at the reproducing height h by the spring 6, the pickup 10 is positioned intermediate the sound conductor body 9 and the record 5. The pickup 10 is stopped at the reproduction finished position against the urging force of the return spring 15. Under this condition, the pickup 10 and the tone arm 14 are at the positions shown by the broken lines in FIG. 3. The end portion 14c of the tone arm 14 opens the switch 18, thereby stopping the motor 11 and halting the rotation of the turntable 2.

Figure 4B:
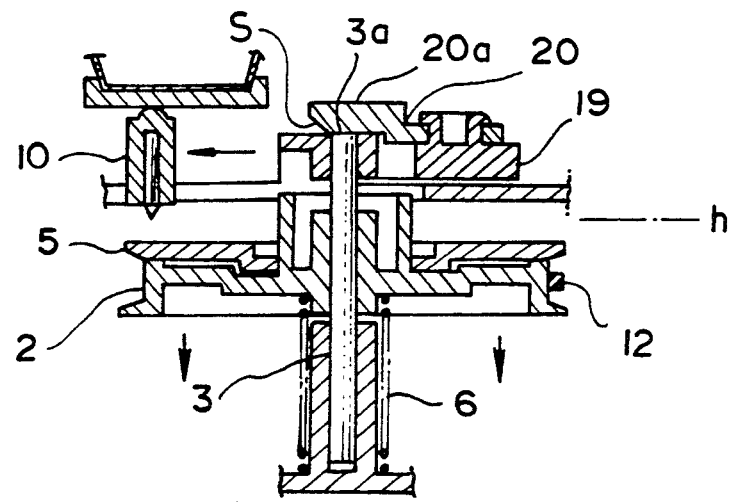

FIG. 4B shows a condition in which a shock is applied to the record playing apparatus to make the weight member 19 rotate.

When the external shock is applied to the record playing apparatus in a horizontal direction, i.e., in a direction parallel to the inside mounting plate 1c, as shown by the broken line in FIG. 3, the weight member 19 is rotated due to an inertia force. At this time, the operating claw 20, which is integral with the weight member 19, is moved towards the rotary shaft 3. The slant surface S of the extreme end portion 20a is brought into abutment with the upper end 3a of the rotary shaft 3. When the operating claw 20 is further moved, the slant surface S presses down the upper end 3a of the rotary shaft 3, thereby lowering the turntable 2 downwardly against the spring 6.

Under this condition, the record 5 is lowered to a position lower than the reproducing height h. Since the stylus force is applied to the pickup 10 by the spring 6 is released, the pickup 10 is returned by being urged by the return spring 15 to the reproduction waiting position at the peripheral edge portion of the record 5.

Furthermore, simultaneously with this operation, the projection 14c of the tone arm 14, which has been operating to open the switch 18, is moved from the reproduction finished position. The switch 18 is closed to start the motor 11. Thus, a driving force of the motor 11 is transmitted to the turntable 2 by the belt 12, and the record 5 begins rotation. However, since the pickup 10 and the record 5 are apart from each other, the sound reproduction of the record 5 is not started.

Figure 4C:
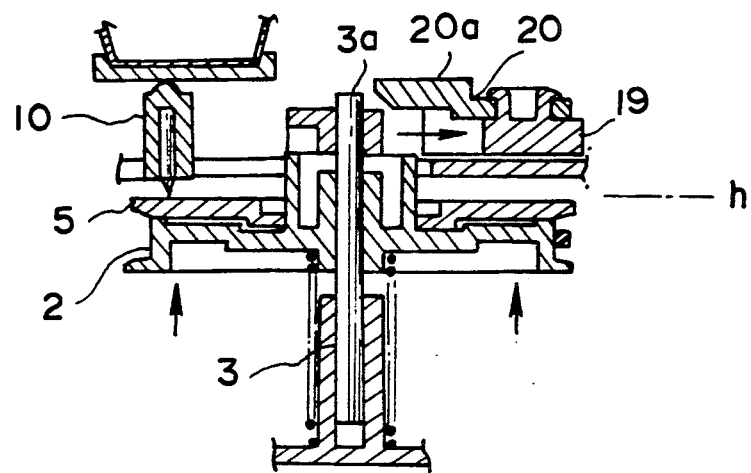

FIG. 4C shows a condition in which sound reproduction is started.

Since the weight member 19, which has once moved towards the rotary shaft 3, is then urged in the opposite direction by the return spring 21. The condition in which the end portion 20a of the operating claw 20, superposed on the upper end 3a of the rotary shaft 3, cannot be maintained anymore. The weight member 19 is therefore returned to the original position. Accordingly, since the pressing force applied to the rotary shaft 3 is extinguished, the turn table 2 is raised by the spring 6, and the record 5 is returned to the reproduction height h. The stylus force is then applied to the pickup 10.

Accordingly, the pickup 10 scans the modulated groove of the record 5 to start the sound reproduction. Ultimately, the pickup 10 moves to the reproduction finsihed position and completes the playing of the record 5. At this time, the projection 14c of the tone arm 14 opens the switch 18. This stops the rotation of the turn table 2, and returns it to the condition of FIG. 4A.

As described in the foregoing, in the record playing apparatus, the interlock mechanism is applied by the weight member 19 to the turn table 2, to move the turn table 2 vertically. As a result, the application and release of the stylus force can be performed without applying an excessive force to the movable members.

In particular, in this embodiment, since the interlock mechanism is defined by the slant surface S of the operating claw 20, the structure is simple, and the durability can be increased. In this embodiment, while the slant surface S is formed on the weight member 19.

Figure 5A:
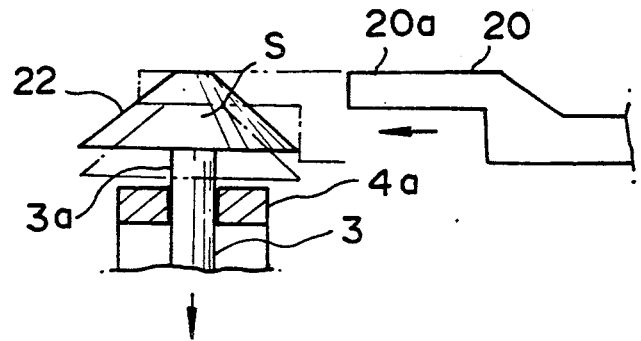
Figure 5B:
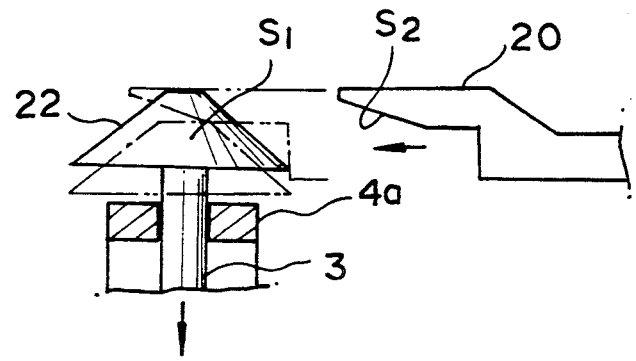

As shown in FIG. 5A, instead of forming the slant surface S on the extreme end portion 20a of the operating claw 20, a cone member 22 may be attached to the upper end 3a of the rotary shaft 3. A side surface of the cone member 22 may be used as the slant surface S. Furthermore, as shown in FIG. 5B, the operating claw 20 may be formed with a slant surface S2. Additionally, a cone member 22 having a slant surface S1 may be attached to the upper end of the rotary shaft 3.

This embodiment is structured so that the operating claw 20 is brought into abutment with the upper end 3a of the rotary shaft 3. However, the operating claw 20 may be structured to abut against other parts. For example, a peripheral edge portion of the turntable 2 to lower than the turntable 2.

Alternatively, the weight member 19 itself may be formed to abut against the rotary shaft 3. A slant surface may be formed in the weight member 19, instead of providing the operating claw 20.

Figure 5C:
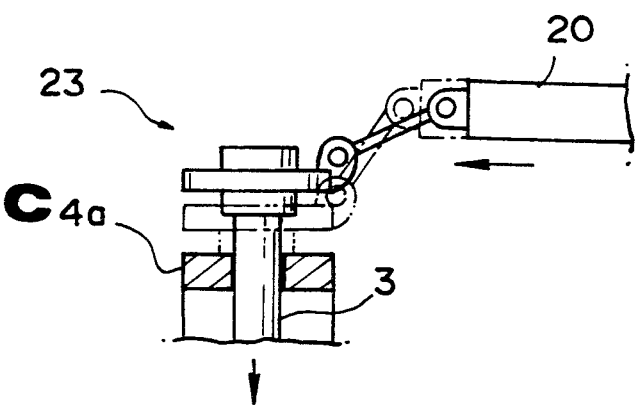

Furthermore, the structure of the interlock mechanism is not limited to the aforementioned structures. As shown in FIG. 5C, a crank 23 may be connected between the turntable 2 and the weight member 19.

In the record playing apparatus of the present invention, the following advantages are provided:

since the speaker cone is not a movable member, and thus, since the weight member is not brought into abutment with the speaker cone, the structure is rigid.

In particular, when the interlock mechanism is defined by a slant surface, the turntable can be moved up and down with a simple structure. Thus, failures can be reduced and durability is very high.

Having, thus, described the invention, what is claimed is:

1. In a shock-start type recording disk reproducing apparatus of the type comprising a recording disk having a modulated groove formed in an upper surface, a pickup for scanning the modulated groove, and a turntable for rotating said recording disk integrally with said turntable, the improvement comprising:

an elastic body connected to said turntable for urging said turntable upwardly to apply a stylus force to said pickup;

a weight member having a substantially flat semicircular shape and being rotatably supported at an eccentric position so that a major portion of said weight member defining a rotating portion is moved towards and away from a rotary shaft of said turntable when said weight member is rotated about the eccentric position as a fulcrum due to an inertia force imparted to the rotating portion upon application of a shock to a casing of said apparatus in a direction horizontal to said turntable;

an interlock mechanism formed between said weight member and said turntable to move said turntable up and down in accordance with a movement of said weight member towards and away from the rotary shaft of said turntable; and a return spring normally urging said weight member at an original position away from the rotary shaft of said turntable so that said weight member returns to the original position once said turn table is moved downwardly to release the stylus force applied to said pickup.

2. A recording disk reproducing apparatus according to claim 1, wherein the rotating portion of said weight member rotates in a plane perpendicular to the rotary shaft of said turn table when the rotating portion is moved towards the rotary shaft, and said interlock includes a slant surface formed at least one of said weight member and said turn table to enable the rotating portion of said weight member to ride over the part of said turn table thereby to press down said turn table.

3. A sound record playing apparatus comprising:
(a) a casing;
(b) a rotary shaft disposed within and attached to the casing;
(c) means for driving the rotary shaft disposed within the casing;
(d) a turn table attached to the shaft;
(e) a record having a modulated groove formed therein, the record disposed upon the turn table;
(f) a tone arm attached to the casing;
(g) a pickup disposed on the tone arm, the pickup capable of scanning the modulated groove;
(h) a speaker cone rigidly attached to the casing and connected to the pickup;

(i) a weight member pivotally attached to the casing; and (j) a biasing means normally urging said weight member at an original position away from said rotary shaft;

(k) and interlock mechanism disposed upon the weight member;

wherein the weight member is rotated against biasing means toward the rotary shaft upon application of an external shock, the interlock mechanism thereupon causing the tone arm to reset itself to a sound reproduction waiting period position, whereupon resetting of the tone arm activates the means for driving the rotary shaft, beginning the playing of the record.

4. The sound record playing apparatus of claim 3, the apparatus further comprising:

a spring, the spring disposed around the rotary shaft intermediate the casing and the turn table.

5. The sound record playing apparatus of claim 3, wherein the means for driving comprises:

(a) a motor disposed within the casing; and (b) a belt connected between the motor and the rotary shaft;

wherein the belt transfer rotational energy to the rotary shaft.

6. The sound record playing apparatus of claim 3, wherein the interlock mechanism comprising:

(a) an operating claw disposed upon the weight member; and, (b) a cone member disposed upon the rotary shaft, wherein the operating claw contacts the cone member, forcing the rotary shaft downwardly.

7. The sound record playing apparatus of claim 3, wherein the interlock mechanism comprises:

a crank, pivotally connected at one end to the weight member and pivotally connected at the other end to the rotary shaft.

8. The sound record playing apparatus of claim 3, wherein the interlock mechanism comprises:

a slant surface formed in the weight member, the slant surface contacting and driving downwardly the rotary shaft.

9. The sound record playing apparatus of claim 3 further comprising:

a switch disposed on the casing connected to the means for driving, the tone arm contacting the switch to start and stop the means for driving.

* * * * *